United States Patent
Park (10) Patent No.: US 10,994,736 B2
(45) Date of Patent: May 4, 2021

(54) SYSTEM AND METHOD FOR PREVENTING OVERHEATING OF AXLE IN CONSTRUCTION MACHINE

(71) Applicant: DOOSAN INFRACORE CO., LTD., Incheon (KR)

(72) Inventor: Kwang Seok Park, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 318 days.

(21) Appl. No.: 16/316,944

(22) PCT Filed: Jul. 13, 2017

(86) PCT No.: PCT/KR2017/007516
§ 371 (c)(1),
(2) Date: Jan. 10, 2019

(87) PCT Pub. No.: WO2018/012900
PCT Pub. Date: Jan. 18, 2018

(65) Prior Publication Data
US 2019/0315356 A1    Oct. 17, 2019

(30) Foreign Application Priority Data
Jul. 13, 2016  (KR) .................. 10-2016-0088363

(51) Int. Cl.
*B60W 30/184*  (2012.01)
*B60T 7/04*  (2006.01)
(Continued)

(52) U.S. Cl.
CPC ......... *B60W 30/1843* (2013.01); *B60T 7/042* (2013.01); *B60T 8/326* (2013.01);
(Continued)

(58) Field of Classification Search
CPC combination set(s) only.
See application file for complete search history.

(56) References Cited

U.S. PATENT DOCUMENTS

| 4,662,332 A | 5/1987 | Bergmann et al. |
| 4,732,055 A * | 3/1988 | Tateno ................ F16H 61/0213 477/73 |

(Continued)

FOREIGN PATENT DOCUMENTS

| JP | H04334733 A | 11/1992 |
| JP | 2515633 | 10/1996 |

(Continued)

OTHER PUBLICATIONS

Search Report issued in related International Patent Application No. PCT/KR2017/007516 dated Sep. 25, 2017, and English translation of same.

(Continued)

*Primary Examiner* — Shelley Chen
(74) *Attorney, Agent, or Firm* — K&L Gates LLP (57) ABSTRACT

The present specification relates to a system and a method for preventing overheating of an axle in a construction equipment. A system for preventing overheating of an axle in a construction equipment is mounted in the construction equipment and transmits driving power of an engine to a wheel, and the system includes: a brake pedal; a brake sensor which detects displacement of the brake pedal when the brake pedal is manipulated by an operator; an exhaust brake which is mounted in the engine and operates and controls an opening degree of an exhaust gas discharge passageway of the engine; and a control unit which adjusts the opening degree of the exhaust gas discharge passageway by controlling the exhaust brake corresponding to the displacement of the brake pedal when manipulation of the brake pedal is detected by the brake sensor.

15 Claims, 5 Drawing Sheets

(51) Int. Cl.
- *B60T 8/32* (2006.01)
- *B60T 8/72* (2006.01)
- *B60T 13/58* (2006.01)
- *B60T 13/66* (2006.01)
- *B60W 10/06* (2006.01)
- *B60W 10/196* (2012.01)
- *B60W 10/198* (2012.01)
- *B60W 30/18* (2012.01)
- *F02D 9/06* (2006.01)

(52) U.S. Cl.
CPC .............. *B60T 8/72* (2013.01); *B60T 13/585* (2013.01); *B60T 13/66* (2013.01); *B60W 10/06* (2013.01); *B60W 10/196* (2013.01); *B60W 10/198* (2013.01); *B60W 30/18109* (2013.01); *F02D 9/06* (2013.01); *B60T 2220/04* (2013.01); *B60T 2250/04* (2013.01); *B60T 2260/08* (2013.01); *B60T 2260/09* (2013.01); *B60W 2510/1005* (2013.01); *B60W 2520/10* (2013.01); *B60W 2540/10* (2013.01); *B60W 2540/12* (2013.01); *B60W 2710/0627* (2013.01)

(56) References Cited

U.S. PATENT DOCUMENTS

| | | | | |
|---|---|---|---|---|
| 4,745,755 A * | 5/1988 | Kawamura | ........... | F02B 37/005 60/608 |
| 4,961,484 A | 10/1990 | Kato et al. | | |
| 5,193,657 A * | 3/1993 | Iizuka | ........ | F02D 9/06 123/323 |
| 8,469,002 B2 * | 6/2013 | Kang | ................. | F02D 13/0219 123/406.26 |
| 9,162,666 B2 | 10/2015 | Holmes | | |
| 9,597,637 B2 * | 3/2017 | Lim | ................... | B01D 53/9431 |
| 9,739,220 B2 * | 8/2017 | Matsubara | .......... | F02D 41/0007 |
| 10,161,344 B2 * | 12/2018 | Dudar | .................... | F02D 17/04 |
| 2011/0011081 A1 | 1/2011 | Quigley | | |
| 2012/0118267 A1 * | 5/2012 | Kang | .................. | F02D 35/028 123/406.26 |
| 2013/0269320 A1 * | 10/2013 | Kwak | .................. | F02D 41/029 60/274 |
| 2013/0333355 A1 * | 12/2013 | Lee | ....................... | E02F 9/2292 60/274 |
| 2015/0369149 A1 * | 12/2015 | Matsubara | .......... | F02D 41/0007 701/103 |
| 2017/0067407 A1 * | 3/2017 | Dudar | ................. | F02D 41/3005 |

FOREIGN PATENT DOCUMENTS

| | | |
|---|---|---|
| JP | 2000159087 | 6/2000 |
| JP | 2014218855 | 11/2014 |
| KR | 910007139 | 9/1991 |
| KR | 20040021047 | 3/2004 |

OTHER PUBLICATIONS

Written Opinion issued in related International Patent Application No. PCT/KR2017/007516 dated Sep. 25, 2017.

European Search Report for related European Application No. 17827970.9; action dated May 20, 2019; (15 pages).

Chinese Office Action for related Chinese Application No. 201780043655.9; action dated Feb. 3, 2021; (8 pages).

* cited by examiner

SYSTEM AND METHOD FOR PREVENTING OVERHEATING OF AXLE IN CONSTRUCTION MACHINE

CROSS REFERENCE TO RELATED APPLICATIONS

The present application is a National Stage of International Application No. PCT/KR2017/007516, filed on Jul. 13, 2017, which claims priority to Korean Patent Application No. 10-2016-0088363, filed on Jul. 13, 2016, the entire contents of each of which are being incorporated herein by reference.

TECHNICAL FIELD

The present specification relates to a system and a method for preventing overheating of oil in an axle in a construction equipment.

BACKGROUND ART

In general, an axle in a wheel-type construction equipment is a device for transmitting driving power of an engine to a wheel, the largest amount of impulsive load and workload are applied to the axle, and the axle performs an important role in terms of a traveling performance A service brake is sometimes embedded in the axle, and in this case, the service brake and the axle share lubricating oil.

Typically, the service brake of the construction equipment is operated as the amount of oil to be supplied from an oil pump is controlled when an operator manipulates a brake pedal, thereby braking the construction equipment. Heat is generated when the service brake operates, and lubricating oil in the axle is heated by the heat. Due to the nature of the construction equipment, the service brake often operates, and thus the lubricating oil is heated and then overheated by the service brake. The overheated lubricating oil is degraded or adheres in the axle, which may cause a severe breakdown of the axle or the service brake. Therefore, there may occur a problem that safety of the operator, which operates the vehicle, cannot be ensured.

A separate cooler may be installed to prevent overheating of the lubricating oil in the axle, but the installation of the cooler increases manufacturing costs of the construction equipment and complicates a structure of the construction equipment. In the case of a large-scale construction equipment or a special purpose construction equipment, a high-capacity cooler is needed, which causes additional problems in terms of the increase in manufacturing costs and the complicated structure.

There is a need for development of a system capable of eliminating or minimizing a method of mounting the cooler in order to prevent the degradation and adhesion of the oil in the axle.

DISCLOSURE

Technical Problem

An object of an exemplary embodiment of the present specification is to provide a system and a method for preventing overheating of an axle, which are capable of preventing overheating of lubricating oil in the axle.

Technical Solution

A system for preventing overheating of an axle in a construction equipment according to an exemplary embodiment of the present specification prevents overheating of the axle, which is mounted in the construction equipment and transmits driving power of an engine to a wheel, and the system includes: a brake pedal; a brake sensor which detects displacement of the brake pedal when the brake pedal is manipulated by an operator; an exhaust brake which is mounted in the engine and operates and controls an opening degree of an exhaust gas discharge passageway of the engine; and a control unit which adjusts the opening degree of the exhaust gas discharge passageway by controlling the exhaust brake corresponding to the displacement of the brake pedal when the manipulation of the brake pedal is detected by the brake sensor.

In addition, the system for preventing overheating of the axle in the construction equipment may further include an oil pump; and a service brake which brakes the construction equipment by controlling a working fluid supplied from the oil pump, in which when the manipulation of the brake pedal is detected, the control unit controls the exhaust brake to reduce a traveling speed of the construction equipment and then controls the service brake to brake the construction equipment.

In addition, the service brake may be embedded in the axle.

In addition, the system for preventing overheating of the axle in the construction equipment may further include an accelerator pedal; and a sensor which measures displacement of the accelerator pedal, in which when the brake pedal and the accelerator pedal are manipulated by the operator, the control unit calculates a first target engine output corresponding to the manipulation of the brake pedal and a second target engine output corresponding to the manipulation of the accelerator pedal, the control unit controls the exhaust brake corresponding to the displacement of the brake pedal when the first target engine output is equal to or higher than the second target engine output, and the controls unit controls the exhaust brake corresponding to the displacement of the accelerator pedal when the first target engine output is lower than the second target engine output.

In addition, the control unit may have first data made by setting in advance a relationship between a change in displacement of the brake pedal and a change in opening degree of the exhaust gas discharge passageway, and second data made by setting in advance a change in displacement of the accelerator pedal and a change in opening degree of the exhaust gas discharge passageway.

In addition, the control unit may include: a vehicle controller VCU which outputs a control signal for controlling work and traveling of the construction equipment; and an engine controller ECU which receives the control signal outputted from the vehicle controller and controls the supply amount of fuel to the engine, the vehicle controller may control an operation of the service brake for braking the construction equipment and output a command signal for operating the exhaust brake which is calculated corresponding to the displacement of the brake pedal, and the engine controller may control an operation of the exhaust brake corresponding to the command signal for operating the exhaust brake which is received from the vehicle controller.

In addition, the system for preventing overheating of the axle in the construction equipment may further include a selection switch which selects whether to operate the exhaust brake.

A method of preventing overheating of an axle in a construction equipment according to the exemplary embodiment of the present specification is a method of controlling the system for preventing overheating of the axle in the construction equipment, and the method includes: detecting whether the brake pedal is operated by the operator and displacement of the brake pedal; and operating the exhaust brake when the brake pedal operates so that the exhaust gas discharge passageway of the engine has the opening degree corresponding to the displacement of the brake pedal.

In addition, the method of preventing overheating of the axle in the construction equipment may further include checking whether an operational condition of the exhaust brake is satisfied when the operation of the brake pedal is detected, in which when a temperature of lubricating oil in the axle exceeds a predetermined temperature, it is determined that the exhaust brake is in an operable condition.

In addition, the method of preventing overheating of the axle in the construction equipment may further include checking whether an operational condition of the exhaust brake is satisfied when the operation of the brake pedal is detected, in which when a brake operation of the exhaust brake is selected by manipulating a separate switch by the operator, it is determined that the exhaust brake is in an operable condition.

In addition, the method of preventing overheating of the axle in the construction equipment may further include checking whether an operational condition of the exhaust brake is satisfied when the operation of the brake pedal is detected, in which when a gear of the vehicle is not in a neutral state, it is determined that the exhaust brake is in an operable condition.

In addition, the method for preventing overheating of the axle in the construction equipment may include: checking whether a traveling speed of the construction equipment is equal to or lower than a predetermined reference speed when the brake pedal is manipulated; operating a service brake to brake the construction equipment when the traveling speed of the construction equipment is equal to or lower than the reference speed; and operating the exhaust brake to brake the construction equipment when the traveling speed of the construction equipment is higher than the reference speed.

In addition, the method for preventing overheating of the axle in the construction equipment may include: checking an operation amount of the brake pedal when the brake pedal is manipulated; and operating the service brake to brake the construction equipment when the displacement of the brake pedal is equal to or larger than reference displacement.

In addition, the method for preventing overheating of the axle in the construction equipment may include: checking whether an accelerator pedal is manipulated by the operator when the brake pedal is manipulated; calculating a first target engine output corresponding to the displacement of the brake pedal and a second target engine output corresponding to the displacement of the accelerator pedals; comparing the first and second target engine outputs; controlling an operation of the exhaust brake when the first target engine output is higher than the second target engine output, based on first data made by setting in advance a relationship between a change in displacement of the brake pedal and a change in opening degree of the exhaust gas discharge passageway; and controlling an operation of the exhaust brake when a first target engine output is lower than a second target engine output, based on second data made by setting in advance a relationship between a change in displacement of the accelerator pedal and a change in opening degree of the exhaust gas discharge passageway.

Advantageous Effects

According to the exemplary embodiment of the present specification, by utilizing the exhaust brake, it is possible to effectively prevent overheating in terms of a temperature in the axle in a construction equipment even though the service brake frequently operates.

Therefore, a cooler for cooling the lubricating oil in the axle may not be installed or a low-capacity cooler may be used, and as a result, manufacturing costs may be reduced and a structure of the construction equipment may be simplified.

In addition, the operation of the exhaust brake may be performed simply by manipulating the brake pedal, and as a result, it is possible to more easily ensure a braking performance of the construction equipment.

DESCRIPTION OF MAIN REFERENCE
NUMERALS OF DRAWINGS

1: First oil pump
2: Pedal
3: Service brake
4: Oil cooler
5: Second oil pump
6: Switch
7: Solenoid valve
8: Parking brake
10: Brake pedal
20: Brake pedal displacement sensor
30: Vehicle controller
40: Engine controller
50: Engine
55: Exhaust brake
55: Axle

BEST MODE

Hereinafter, exemplary embodiments according to the present disclosure will be described in detail with reference to the accompanying drawings. A configuration of the present disclosure and an operation and an effect according to the configuration of the present disclosure will be clearly understood by the detailed description below. In the following detailed description, the same constituent elements will be designated by the same reference numerals even though the constituent elements are illustrated in different drawings, and a detailed explanation of publicly known configurations may be omitted so as to avoid unnecessarily obscuring the subject matter of the present disclosure.

In addition, the terms first, second, A, B, (a), and (b) may be used to describe constituent elements of the exemplary embodiments of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

A vehicle such as a wheel-type construction equipment includes an engine, an axle, a brake system, and a control unit. The engine provides power to allow the vehicle to travel and perform work. Multiple hydraulic pumps for operating a working device for performing work by the vehicle are supplied with power from the engine. The multiple hydraulic pumps may be connected to respective drive units of the vehicle through a hydraulic system.

The axle is connected to the engine through a power transmission mechanism such as a transmission and a propeller shaft, and the power of the engine is transmitted to a wheel through the axle, such that the vehicle may travel.

The control unit controls work or traveling of the vehicle corresponding to a manipulation of an operator and may include a vehicle controller VCU and an engine controller ECU. The vehicle controller may operate the working device by controlling the hydraulic system corresponding to the manipulation of the operator and may enable the vehicle to travel and be braked corresponding to a manipulation of a brake pedal and a manipulation of an accelerator pedal.

When the brake pedal and the accelerator pedal are manipulated, the vehicle controller outputs an appropriate control signal to the engine controller, and the engine controller may adjust an output of the engine by adjusting the amount of fuel to be injected into the engine based on the control signal outputted from the vehicle controller. Depending on the circumstances, the vehicle controller and the engine controller may be configured in the form of a single controller.

When the operator operates the brake pedal, a parking brake manipulator, or the like, the brake system serves to brake the traveling vehicle or fix the stopped vehicle to prevent the vehicle from traveling. To this end, the brake system includes the brake pedal, a service brake system, and a parking brake system.

Figure 1:
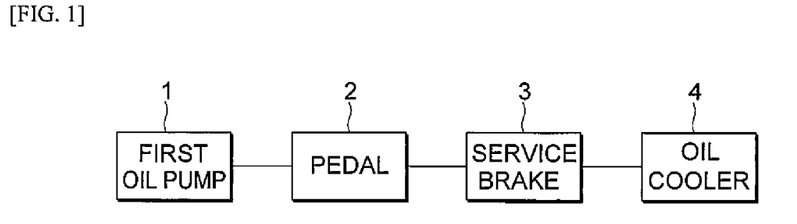
FIG. 1 is a view illustrating a service brake system of a construction equipment according to an exemplary embodiment of the present specification.
Figure 2:
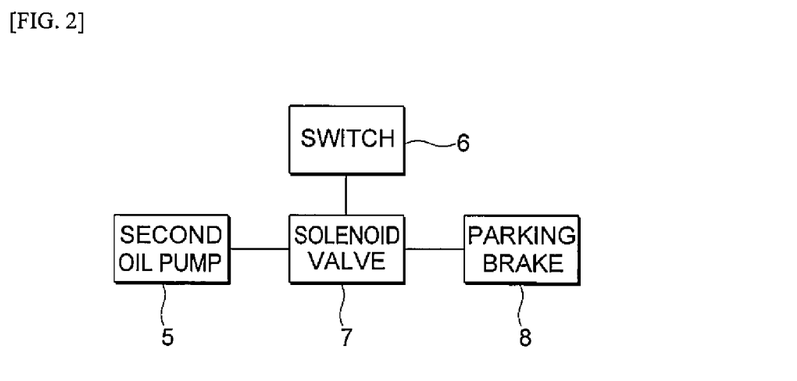
FIG. 2 is a view illustrating a parking brake system according to the exemplary embodiment of the present specification.

FIG. 1 is a view illustrating a service brake system of a construction equipment according to an exemplary embodiment of the present specification and FIG. 2 is a view illustrating a parking brake system according to the exemplary embodiment of the present specification.

Referring to FIG. 1, the service brake system of the construction equipment may include a first oil pump 1, a brake pedal 2, a service brake 3, and an oil cooler 4. When the operator manipulates the brake pedal 2, the amount of a working fluid to be supplied from the first oil pump 1 to the service brake 3 is controlled, such that braking force is generated by the service brake 3. To this end, the service brake 3 includes a rotary mechanism which rotates together with the wheel, and a non-rotary mechanism which does not rotate. The rotary mechanism and the non-rotary mechanism generate frictional force by being brought into close contact with each other by the working fluid supplied from the first oil pump 1, thereby stopping the rotation of the wheel, that is, braking the traveling vehicle.

The parking brake system may be used to maintain the stopped vehicle in a fixed state or to brake the vehicle traveling at a low speed. As illustrated in FIG. 2, the parking brake system includes a second oil pump 5, a switch 6, a solenoid valve 7, and a parking brake 8. The operation of the parking brake may be performed by various methods, and in the construction equipment, the operation of the parking brake is generally performed by turning on/off the parking brake switch 6. When the operator manipulates the parking brake switch 6, the solenoid valve 7 is also turned on/off, such that the amount of oil to be supplied from the second oil pump 5 to the parking brake 8 is controlled. Therefore, braking force is generated or released in the parking brake 8.

Meanwhile, the service brake 3 may be mounted outside the axle or installed inside the axle. The service brake 3 installed inside the axle may reduce abrasion by utilizing lubricating oil for lubricating an interior of the axle. Heat is inevitably generated when the service brake 3 is used, and the lubricating oil is heated by the heat, and as a result, the lubricating oil may be degraded or adhere in the axle. A risk of overheating the lubricating oil is increased as the service brake 3 is often used. However, the risk of overheating the lubricating oil is further increased in a case in which the traveling and the braking are frequently performed to perform work and the construction equipment has a large vehicle weight. Therefore, the construction equipment may further include a cooler installed to cool the lubricating oil. It may be advantageous, in terms of manufacturing costs and maintenance, to prevent overheating of the lubricating oil and thus omit installation of the cooler or reduce a capacity of the cooler. To this end, in the present specification, as described below, an axle overheating prevention system 100 is further included.

Figure 3:
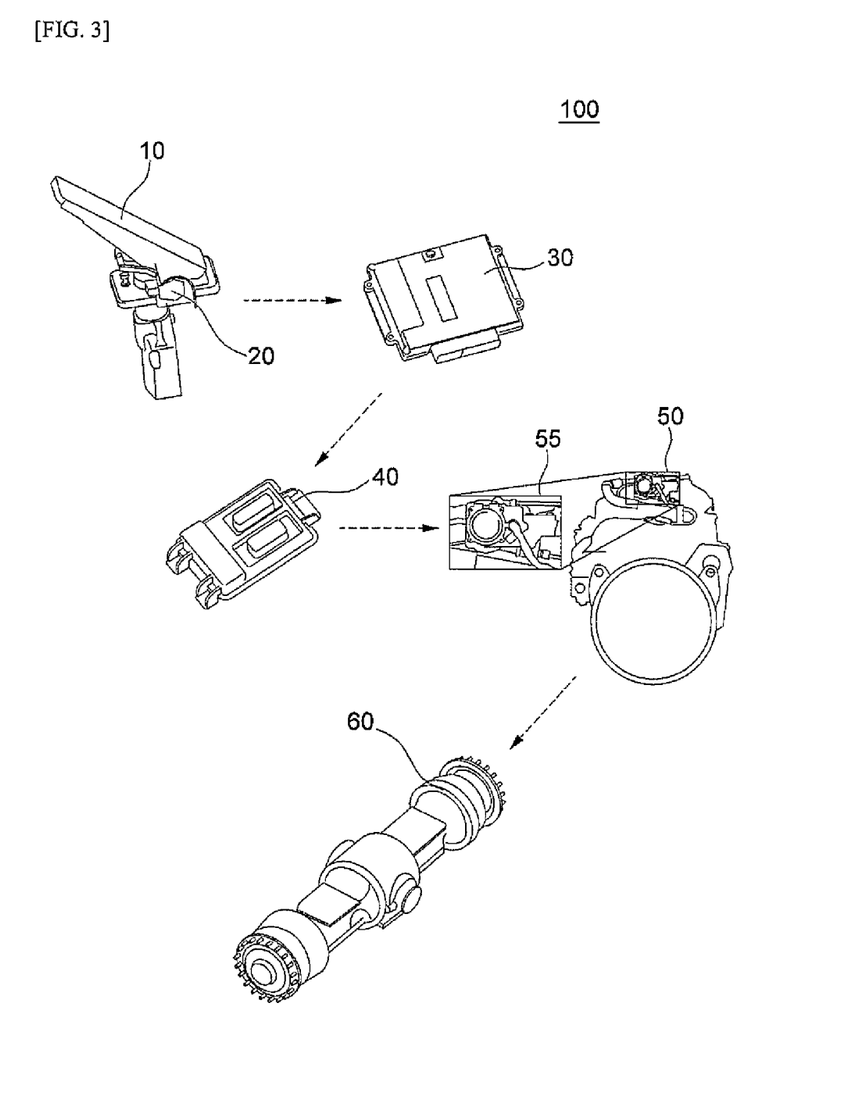
FIG. 3 is a view illustrating an axle overheating prevention system using an engine exhaust brake according to the exemplary embodiment of the present specification.

FIG. 3 is a view illustrating the axle overheating prevention system 100 using an engine exhaust brake according to the exemplary embodiment of the present specification.

Referring to FIG. 3, the axle overheating prevention system 100 may include a brake pedal 10, a brake pedal displacement sensor 20, a vehicle controller (vehicle control unit (VCU)) 30, an engine controller (engine control unit (ECU)) 40, an engine 50, an exhaust brake 55, an axle 60, an engine brake (not illustrated), and an accelerator pedal (not illustrated). The exhaust brake 55 may control a rotational speed of the engine based on back pressure generated in an exhaust gas discharge passageway (exhaust pipe) by adjusting an opening degree of the exhaust gas discharge passageway of the engine. To this end, the exhaust brake 55 may include a valve which is installed in the exhaust gas discharge passageway, and an actuator which operates the valve to adjust the opening degree of the exhaust gas discharge passageway. The operation of the exhaust brake may be controlled by the vehicle controller or the engine controller. The operation of the exhaust brake 55 illustrated in FIG. 3 is controlled by the engine controller 40, and the engine controller 40 may control the exhaust brake 55 and a fuel injection amount corresponding to a control signal which is outputted from the vehicle controller 30 corresponding to the manipulation of the brake pedal 10. Hereinafter, the operation of the exhaust brake will be described in detail.

When the operator presses the brake pedal 10 while the vehicle travels, the vehicle needs to be braked. The brake pedal displacement sensor 20 detects displacement of the brake pedal 10 caused by the manipulation of the operator, and transmits the displacement of the brake pedal 10 to the vehicle controller 30. The vehicle controller 30 receives the displacement of the brake pedal 10 detected by the brake pedal displacement sensor 20 and performs the control corresponding to the received displacement of the brake pedal 10. That is, a control command signal for controlling an operation of the service brake system or instructing an output of the exhaust brake 55 is transmitted to the engine controller 40.

Here, the exhaust brake 55 may be operated when a predetermined condition is satisfied. For example, the exhaust brake 55 may be operated in a case in which a gear of the vehicle is in a neutral state. When the gear of the vehicle is in the neutral state, the vehicle does not travel, and as a result, the exhaust brake operates, such that it is not necessary to adjust an output of the engine. While the vehicle performs work in a stopped state, it is possible to prevent deterioration of work efficiency caused by a decrease in output of the engine. Another operational condition of the exhaust brake 55 is a temperature of the lubricating oil in the axle 60. In a case in which the temperature of the lubricating oil in the axle 60 is equal to or lower than a predetermined temperature, the lubricating oil need not be cooled, and thus the exhaust brake 55 need not be operated. An operational condition of the exhaust brake 55 may be the selection of whether to operate the exhaust brake 55 by the operator. In this case, the operator may decide in advance whether to use the exhaust brake 55 and perform the corresponding function by manipulating a selection switch separately provided in an operator seat. In the present exemplary embodiment, an example in which the exhaust brake 55 is operated by the manipulation of the brake pedal 10 will be described.

The exhaust brake 55 may be operated for other purposes in addition to the purpose of cooling the lubricating oil in the axle. For example, the exhaust brake 55 may be operated in a case in which a traveling direction of the vehicle is changed. When the traveling direction of the vehicle is changed from forward to rearward or from rearward to forward, there occurs a section in which the connection of the transmission is temporarily released. In this case, a load applied to the engine may be temporarily reduced, and thus the rotational speed of the engine may be rapidly increased. When the rotational speed of the engine is increased as described above, the hydraulic system for the working device may be adversely affected or there may occur a safety problem. To prevent a temporary increase in rotational speed of the engine, the exhaust brake may be controlled to be operated at the moment when the connection of the transmission for changing the traveling direction of the vehicle is released. In addition, when the vehicle travels down a slope, the exhaust brake may control the rotational speed of the engine to serve to prevent a speed of the vehicle from being excessively increased.

Meanwhile, the exhaust brake may be used together with the service brake or the exhaust brake and the service brake may be sequentially used. The reason is that when the vehicle travels at a low speed, the temperature of the lubricating oil may be managed even though the service brake is used. Therefore, the exhaust brake may be used only when the vehicle travels at a speed equal to or higher than a predetermined speed. In this case, the exhaust brake brakes the vehicle until the speed of the vehicle reaches a predetermined reference speed, and the service brake may operate to brake the vehicle when the speed of the vehicle reaches the predetermined reference speed. The exhaust brake may continuously operate even at the moment when the service brake operates.

In addition, due to the nature of work of the vehicle such as the construction equipment, the accelerator pedal and the brake pedal are sometimes operated simultaneously. For example, there is a situation in which high power needs to be supplied to the working device while the vehicle is being stopped or braked, and in this case, the brake pedal and the accelerator pedal may be operated simultaneously. To this end, the vehicle controller may store first data which are made by setting amounts of change in operation amount of the exhaust brake (i.e., opening degree of the exhaust gas discharge passageway) corresponding to displacement of the brake pedal, and second data which are made by setting amounts of change in opening degree of the discharge passageway corresponding to the displacement of the accelerator pedal. The data are provided to select any one of the brake pedal and the accelerator pedal depending on the circumstances and operate the exhaust brake when the two pedals operate simultaneously. The opening degree of the exhaust gas discharge passageway may be calculated as various values by the vehicle controller. For example, when the brake pedal is manipulated, a target engine rotational speed corresponding to the displacement of the brake pedal may be calculated, the target engine rotational speed and the current engine rotational speed are compared, and as a result, an appropriate opening degree may be calculated. Other parameters related to the output of the engine may be used in addition to the engine rotational speed and the opening degree of the exhaust gas discharge passageway.

In addition to the service brake, the exhaust brake may be used together with brakes in other forms. The examples of the brakes may include other engine brakes or other parking brakes in consideration of a special situation such as emergency braking.

Figure 4:
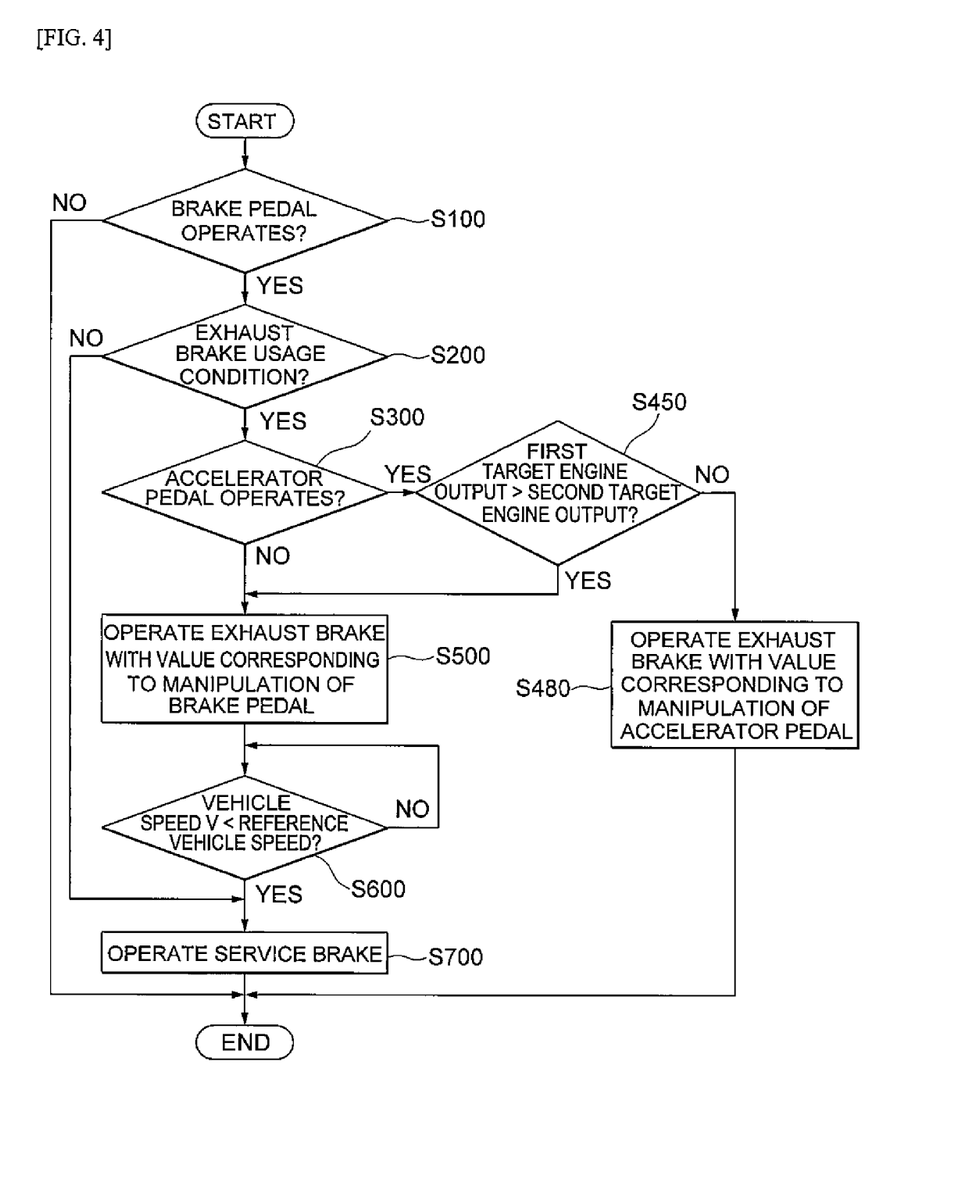
FIG. 4 is a flowchart for explaining an axle overheating prevention method using the engine exhaust brake according to the exemplary embodiment of the present specification.

Hereinafter, a specific operation of the exhaust brake 55 will be described with reference to FIGS. 4 and 5. FIG. 4 is a flowchart for explaining an axle overheating prevention method using the engine exhaust brake according to the exemplary embodiment of the present specification, and FIG. 5 is a graph for explaining the operation of the exhaust brake in accordance with the displacement of the brake pedal according to the exemplary embodiment of the present specification.

Referring to FIG. 4, the vehicle controller detects whether the brake pedal is operated or not first (S100). Whether the brake pedal operates may be detected by the brake pedal displacement sensor, and a detection signal is inputted to the vehicle controller. When it is determined that the brake pedal operates, whether an exhaust brake usage condition is satisfied is checked (S200). The exhaust brake usage condition may be the neutral state of the gear, the temperature of the lubricating oil, whether the exhaust brake is selected, a traveling speed of the vehicle, and the like. When the exhaust brake usage condition is not satisfied, the vehicle controller operates the service brake to brake the vehicle (S700). When the operational condition of the exhaust brake is satisfied, the vehicle controller calculates an engine control value corresponding to the displacement of the brake pedal. The target engine rotational speed, the opening degree of the exhaust gas discharge passageway, and the like may be considered as the engine control value, and the vehicle controller according to the present exemplary embodiment calculates the target engine rotational speed and outputs the target engine rotational speed to the engine controller to operate the exhaust brake (S500). When the exhaust brake operates, only the exhaust brake may be used, or an additional brake system such as the service brake may be additionally used. FIG. 4 illustrates that the method includes step S600 of comparing a vehicle speed V, which is decreased by the operation of the exhaust brake, with a predetermined reference vehicle speed Yr. Only the exhaust brake is continuously used when the vehicle speed V is higher than the reference vehicle speed Vr, and the service brake may be additionally operated when the vehicle speed V is decreased to become equal to or lower than the reference vehicle speed Vr (S700). The use of the exhaust brake and the use of the service brake may be adjusted by other methods in addition to the aforementioned method of adjusting the use of the exhaust brake and the use of the service brake in accordance with the vehicle speed.

Figure 5:
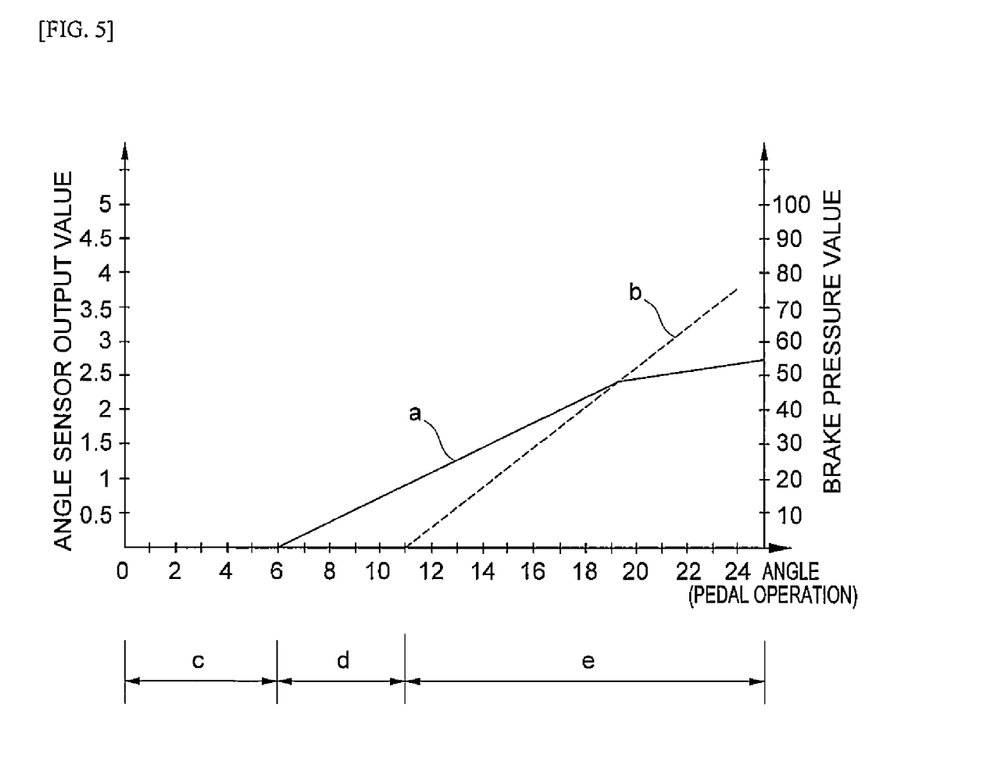
FIG. 5 is a graph for explaining an operation of an exhaust brake in accordance with displacement of a brake pedal and displacement of an accelerator pedal according to another exemplary embodiment of the present specification.

FIG. 5 illustrates, as an example, points in time at which the exhaust brake and the service brake operate and operational intensities of the exhaust brake and the service brake. A line a may be a line that illustrates a change in pressure of the exhaust brake 55 in accordance with angles at which the operator presses the brake pedal 10, and a line b may be a line that illustrates a change in pressure of the service brake in accordance with the angles at which the operator presses the brake pedal 10. There may be factors that need to be additionally considered when utilizing these data, and the factors will be additionally described. Referring to the lines in the graph of FIG. 5, a section 'c' may be a section in which the exhaust brake does not operate even though the brake pedal operates. This configuration is made by considering a case in which the brake pedal or the like finely operates regardless of the operator's intention, and this configuration may be made to prevent a safety problem that occurs as the exhaust brake operates regardless of the operator's intention or to prevent the operator from suffering from fatigue.

Figure 6:
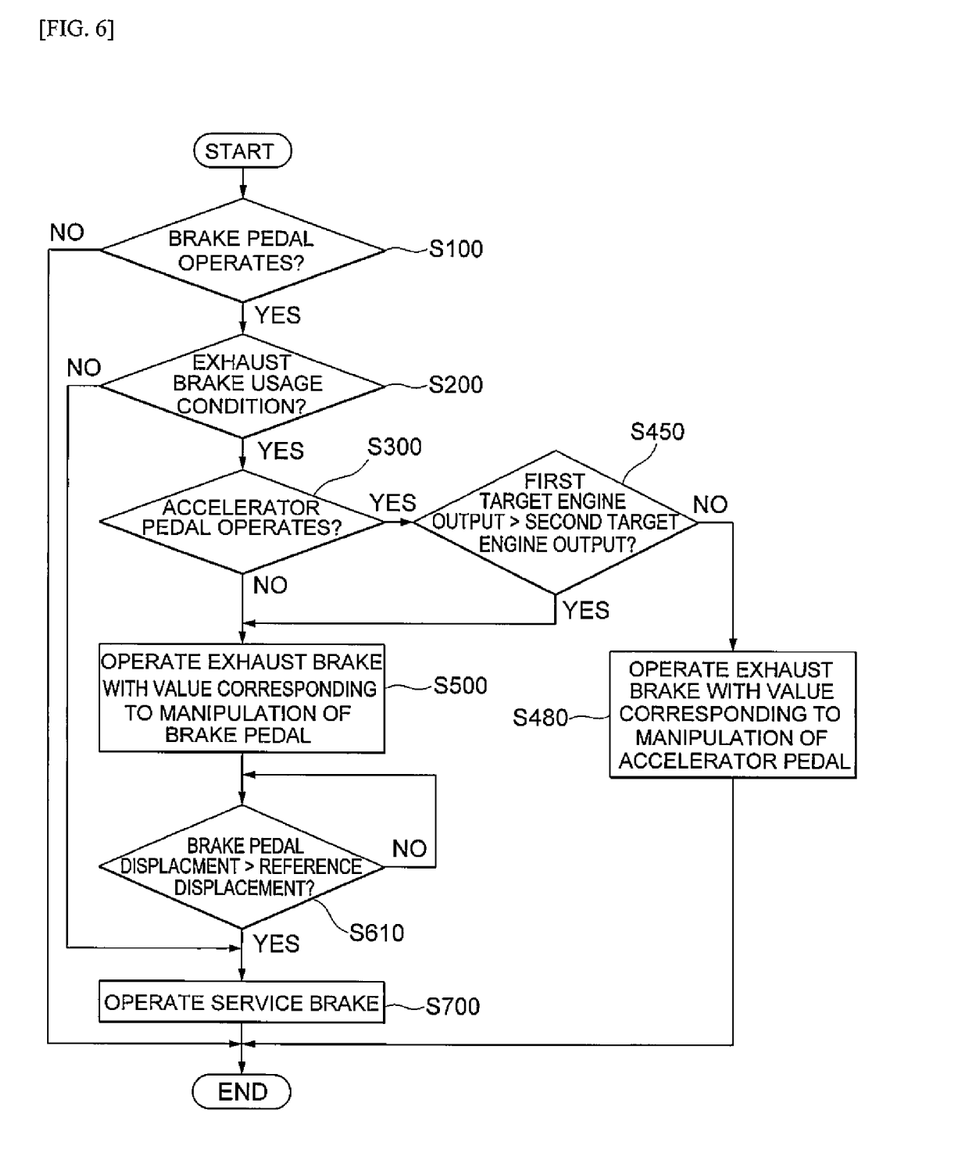
FIG. 6 is a flowchart for explaining an axle overheating prevention method using an engine exhaust brake according to another exemplary embodiment of the present specification.

In addition, a section 'd' in FIG. 5 may be an initial vehicle speed decrease section in which the exhaust brake begins to operate. In this section, only the exhaust brake may operate. Further, a section 'e' in FIG. 5 is a section made for the purpose of rapid deceleration and braking, that is, a section in which the exhaust brake and a hydraulic brake operate complexly. Even in the section 'e', a safety problem or a severe problem of the vehicle may occur in a section in which the brake pedal often operates. Therefore, in this section, the pressure of the service brake, which makes higher braking force, may be maximally used. The operation of the exhaust brake and the operation of the service brake may be adjusted in accordance with the displacement of the brake pedal, as described above. When utilizing this configuration, the determination may be made based on the displacement of the brake pedal instead of the vehicle speed V, as illustrated in FIG. 6 (S610). That is, in a case in which the displacement caused by the manipulation of the brake pedal is larger than predetermined reference displacement, the control unit determines that rapid braking is required, and the control unit controls and operates the service brake. Depending on the circumstances, the control unit may also operate the exhaust brake simultaneously, thereby increasing the braking force of the vehicle.

Meanwhile, in the vehicle such as the construction equipment, the accelerator pedal may also be manipulated together with the brake pedal depending on working environments, and an exhaust brake operating method, which considers this situation, will be described below. Referring to FIG. 4, the brake pedal is manipulated first (S100), and the vehicle controller checks whether the accelerator pedal is additionally manipulated (S400) when the exhaust brake usage condition is satisfied (S200). The manipulation of the accelerator pedal may be detected by a separate accelerator pedal displacement sensor (not illustrated) connected to the accelerator pedal. When the accelerator pedal is not manipulated, the exhaust brake operates corresponding to the manipulation of the brake pedal. Because this process is the same as the aforementioned process, a detailed description thereof will be omitted. When the accelerator pedal is manipulated, the vehicle controller compares a first target engine output (Target RPM 1), which corresponds to the operation amount of the brake pedal, with a second target engine output (Target RPM 2) which corresponds to the operation amount of the accelerator pedal (S450).

In a case in which the first target engine output (Target RPM 1) is higher than the second target engine output (Target RPM 2) based on the comparison result, it may be determined that the output of the engine requested by the manipulation of the accelerator pedal is lower than the current output of the engine. Therefore, the exhaust brake operates with a value corresponding to the manipulation of the brake pedal (S500). In a case in which the second target engine output (Target RPM 2) is higher than the first target engine output (Target RPM 1) based on the comparison result, it may be determined that the output of the engine requested by the manipulation of the accelerator pedal is higher than the current output of the engine. This situation may occur when work with a high load needs to be performed simultaneously while braking the vehicle. Therefore, the exhaust brake operates with a value corresponding to the manipulation of the accelerator pedal (S480). To prepare for the situation in which both of the two pedals operate, the vehicle controller needs to calculate an appropriate operation amount of the exhaust brake that corresponds to the manipulations of the pedals. To this end, the vehicle controller may store in advance the first data which is to be referenced when operating the exhaust brake based on the brake pedal, and the second data which is to be referenced when operating the exhaust brake based on the accelerator pedal.

Referring to FIG. 5, the line a is a line that may correspond to the first data and illustrate a change in pressure of the exhaust brake 55 in accordance with the angles at which the operator presses the brake pedal 10. Similar to the first data, the second data may be set based on the accelerator pedal. In some instances, the method may further include a step of storing, in the vehicle controller VCU, an output value of the exhaust brake 55 which corresponds to the displacement of the brake pedal 10 and an output value of the exhaust brake 55 which corresponds to the rotational speed of the engine 50 in accordance with the manipulation of the accelerator pedal.

It may be understood by a person skilled in the art that the present specification may be carried out in other specific forms without changing the technical spirit or the essential characteristics of the present specification. Therefore, it should be understood that the above-described exemplary embodiments are illustrative in all aspects and do not limit the present specification. The scope of the present specification is represented by the claims to be described below rather than the detailed description, and it should be interpreted that all the changes or modified forms, which are derived from the meaning and the scope of the claims and the equivalents thereto, are included in the scope of the present specification.

Meanwhile, the exemplary embodiments of the present specification are disclosed in the present specification and the drawings, and specific terms are used, but the specific terms are used as general meanings merely for easily explaining the technical contents of the present specification and helping understand the present disclosure, but not intended to limit the scope of the present specification. It is obvious to those skilled in the art to which the present specification pertains that other modified embodiments may be carried out based on the technical spirit of the present specification in addition to the exemplary embodiments disclosed herein.

The invention claimed is:

1. A system for preventing overheating of an axle which is mounted in a construction equipment and transmits driving power of an engine to a wheel, the system comprising:
a brake pedal;
a brake sensor which detects displacement of the brake pedal when the brake pedal is manipulated by an operator;
an exhaust brake which is mounted in the engine and operates and controls an opening degree of an exhaust gas discharge passageway of the engine; and
a control unit which adjusts the opening degree of the exhaust gas discharge passageway by controlling the exhaust brake corresponding to the displacement of the brake pedal when the manipulation of the brake pedal is detected by the brake sensor;
an accelerator pedal; and
a sensor which measures displacement of the accelerator pedal,
wherein when the brake pedal and the accelerator pedal are manipulated by the operator, the control unit calculates a first target engine output corresponding to the manipulation of the brake pedal and a second target engine output corresponding to the manipulation of the accelerator pedal, the control unit controls the exhaust brake based on a comparison result between the first target engine output and the second target engine output.

2. The system of claim 1, further comprising:
an oil pump; and a service brake which brakes the construction equipment by controlling a working fluid supplied from the oil pump,
wherein when the manipulation of the brake pedal is detected, the control unit controls the exhaust brake to reduce a traveling speed of the construction equipment and then controls the service brake to brake the construction equipment.

3. The system of claim 2, wherein the service brake is embedded in the axle.

4. The system of claim 1, wherein the control unit controls the exhaust brake corresponding to the displacement of the brake pedal when the first target engine output is equal to or higher than the second target engine output, and the controls unit controls the exhaust brake corresponding to the displacement of the accelerator pedal when the first target engine output is lower than the second target engine output.

5. The system of claim 4, wherein the control unit has first data made by setting in advance a relationship between a change in displacement of the brake pedal and a change in opening degree of the exhaust gas discharge passageway, and second data made by setting in advance a change in displacement of the accelerator pedal and a change in opening degree of the exhaust gas discharge passageway.

6. The system of claim 1, wherein the control unit includes:
a vehicle controller VCU which outputs a control signal for controlling work and traveling of the construction equipment; and
an engine controller ECU which receives the control signal outputted from the vehicle controller and controls the supply amount of fuel to the engine,
the vehicle controller controls an operation of the service brake for braking the construction equipment and outputs a command signal for operating the exhaust brake which is calculated corresponding to the displacement of the brake pedal, and
the engine controller controls an operation of the exhaust brake corresponding to the command signal for operating the exhaust brake which is received from the vehicle controller.

7. The system of claim 1, further comprising:
a selection switch which selects whether to operate the exhaust brake.

8. A construction equipment having the system for preventing overheating of an axle according to claim 1.

9. A method of controlling the system for preventing overheating of an axle according to claim 1, the method comprising:
detecting whether the brake pedal is operated by the operator and the displacement of the brake pedal; and
operating the exhaust brake when the brake pedal operates so that the exhaust gas discharge passageway of the engine has the opening degree corresponding to the displacement of the brake pedal.

10. The method of claim 9, further comprising:
checking whether an operational condition of the exhaust brake is satisfied when the operation of the brake pedal is detected,
wherein when a temperature of lubricating oil in the axle exceeds a predetermined temperature, it is determined that the exhaust brake is under an operable condition.

11. The method of claim 9, further comprising:
checking whether an operational condition of the exhaust brake is satisfied when the operation of the brake pedal is detected,
wherein when a brake operation of the exhaust brake is selected by manipulating a separate switch by the operator, it is determined that the exhaust brake is in an operable condition.

12. The method of claim 9, further comprising:
checking whether an operational condition of the exhaust brake is satisfied when the operation of the brake pedal is detected,
wherein when a gear of the vehicle is not in a neutral state, it is determined that the exhaust brake is in an operable condition.

13. The method of claim 9, comprising:
checking whether a traveling speed of the construction equipment is equal to or lower than a predetermined reference speed when the brake pedal is manipulated;
operating a service brake to brake the construction equipment when the traveling speed of the construction equipment is equal to or lower than the reference speed; and
operating the exhaust brake to brake the construction equipment when the traveling speed of the construction equipment is higher than the reference speed.

14. The method of claim 9, comprising:
checking an operation amount of the brake pedal when the brake pedal is manipulated; and
operating the service brake to brake the construction equipment when the displacement of the brake pedal is equal to or larger than reference displacement.

15. The method of claim 9, comprising:
checking whether an accelerator pedal is manipulated by the operator when the brake pedal is manipulated;
calculating a first target engine output corresponding to the displacement of the brake pedal and a second target engine output corresponding to the displacement of the accelerator pedals;
comparing the first and second target engine outputs;
controlling an operation of the exhaust brake when the first target engine output is higher than the second target engine output, based on first data made by setting in advance a relationship between a change in displacement of the brake pedal and a change in opening degree of the exhaust gas discharge passageway; and
controlling an operation of the exhaust brake when a first target output is lower than a second target engine output, based on second data made by setting in advance a relationship between a change in displacement of the accelerator pedal and a change in opening degree of the exhaust gas discharge passageway.

* * * * *